US011315230B2

(12) United States Patent
Atzmon et al.

(10) Patent No.: US 11,315,230 B2
(45) Date of Patent: *Apr. 26, 2022

(54) SYSTEM, METHOD AND COMPUTER PROGRAM PRODUCT FOR ANALYZING JPEG IMAGES FOR FORENSIC AND OTHER PURPOSES

(71) Applicant: Au10tix Ltd., Hod Hasharon (IL)

(72) Inventors: Ron Atzmon, Tel Aviv (IL); Sergey Markin, Herzeliya (IL); Yael Moscovitz, Mevaseret Zion (IL); Vadim Vereschagin, Haifa (IL)

(73) Assignee: AU10TIX LTD., Hod Hasharon (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/021,747

(22) Filed: Sep. 15, 2020

(65) Prior Publication Data

US 2021/0065355 A1  Mar. 4, 2021

Related U.S. Application Data

(63) Continuation of application No. 16/036,404, filed on Jul. 16, 2018, now Pat. No. 10,810,722.

(30) Foreign Application Priority Data

Jul. 17, 2017  (IL) .......................................... 253532

(51) Int. Cl.
*G06T 7/00* (2017.01)
*G06T 1/00* (2006.01)
(Continued)

(52) U.S. Cl.
CPC .......... *G06T 7/0002* (2013.01); *G06T 1/0028* (2013.01); *G06T 7/70* (2017.01);
(Continued)

(58) Field of Classification Search
CPC ....... G06T 7/0002; G06T 1/0028; G06T 7/70; G06T 2207/20052; G06T 2201/0201;
(Continued)

(56) References Cited

U.S. PATENT DOCUMENTS

| | | | |
|---|---|---|---|
| 7,720,288 B2 | 5/2010 | Luo et al. | |
| 9,406,030 B2 | 8/2016 | Dolev et al. | |

(Continued)

FOREIGN PATENT DOCUMENTS

| | | |
|---|---|---|
| WO | 2011/058553 A2 | 5/2011 |
| WO | 2011/058554 A1 | 5/2011 |

OTHER PUBLICATIONS

Ting, Z. et al., "Doctored JPEG Image Detection Based on Double Compression Features Analysis," 2009 ISECS International Colloquium on Computing, Communication, Control and Management, pp. 76-80.

(Continued)

*Primary Examiner* — Phuoc Tran
(74) *Attorney, Agent, or Firm* — Oliff PLC

(57) ABSTRACT

Forensic method for identifying forged documents. For each of a stream of incoming jpeg images, using a processor configured for determining whether jpeg image/s is a replacement forgery by determining whether a first portion of individual image which resides at a known location (known likely to be replaced by forger) within the individual jpeg image has been replaced, including: indicator, face-djpg, for the first portion at known location; computing indicator, aka nonface-djpg, for a second portion of individual image which resides at a comparison location within the jpeg image known as unlikely to be replaced by a forger; and determining whether face-djpg and nonface-djpg fulfill predetermined logical criterion and deciding whether the individual jpeg image is a replacement forgery accordingly.

23 Claims, 5 Drawing Sheets

100. Determine Single-Double Compression Differentiation Threshold T aka Resonance Threshold T for determining presence or absence of resonance in regions of image I (e.g. using method of Figs. 2 or 5 below or any other method, depending on use-case's criteria for successful detection).
↓
110. Within the image I mark two rectangular regions: the FaceCrop region where the personal photograph is located, and a DocBody region that has no intersection with the FaceCrop region.
↓
120. Compute DJPG features Face-DJPG-indicator F1 and Non-face-DJPG-indicator F2 for the FaceCrop and DocBody regions respectively (e.g. as per Fig. 3 below).
↓
130. If resonance is deemed present outside of FaceCrop region but not in FaceCrop region, generate an output indication that a Photo Replacement forgery is suspected.

(51) Int. Cl.

| | |
|---|---|
| *G06V 10/426* | (2022.01) |
| *G06V 10/50* | (2022.01) |
| *G06V 10/75* | (2022.01) |
| *G06V 30/40* | (2022.01) |
| *G06V 40/40* | (2022.01) |
| *G06V 40/16* | (2022.01) |
| *G06T 7/70* | (2017.01) |
| *G06V 30/10* | (2022.01) |
| *G06K 7/14* | (2006.01) |

(52) U.S. Cl.
CPC .......... *G06V 10/426* (2022.01); *G06V 10/507* (2022.01); *G06V 10/758* (2022.01); *G06V 30/40* (2022.01); *G06V 40/161* (2022.01); *G06V 40/172* (2022.01); *G06V 40/40* (2022.01); *G06K 7/1413* (2013.01); *G06T 2201/0201* (2013.01); *G06T 2207/20052* (2013.01); *G06T 2207/20056* (2013.01); *G06T 2207/30168* (2013.01); *G06T 2207/30176* (2013.01); *G06V 30/10* (2022.01)

(58) Field of Classification Search
CPC . G06T 2207/30168; G06T 2207/30176; G06T 2207/20056; G06K 9/00288; G06K 9/6212; G06K 9/00899; G06K 9/00228; G06K 9/4647; G06K 9/469; G06K 9/00442; G06K 7/1413; G06K 2209/01; G06V 10/426; G06V 10/507; G06V 10/758; G06V 30/40; G06V 40/161; G06V 40/172; G06V 40/40; G06V 30/10
See application file for complete search history.

(56) References Cited

U.S. PATENT DOCUMENTS

| | | | |
|---|---|---|---|
| 10,810,722 B2* | 10/2020 | Atzmon | ............. G06K 9/00288 |
| 2009/0257656 A1 | 10/2009 | Shi et al. | |
| 2017/0091588 A1 | 3/2017 | Liu | |

OTHER PUBLICATIONS

Bianchi, T. et al., "Image Forgery Localization via Block-Grained Analysis of JPEG Artifacts," IEEE Transactions on Information Forensics and Security, Jun. 2012, vol. 7, No. 3., pp. 1003-1017.

Wang, W. et al., "Exposing Digital Forgeries in Video by Detecting Double Quantization," MM&Sec'09, Sep. 7-8, 2009, pp. 39-47.

Farid, H., "Photo Forensics," 2016, Published by The MIT Press, ISBN #9780262035347.

Agarwala, A. et al., "Interactive Digital Photomontage," ACM Siggraph, 2004, pp. 294-302.

Barrett, W.A., et al., "Object-Based Image Editing," ACM Siggraph, 2002, pp. 777-784.

He. J. et al., "Detecting Doctored JPEG Images Via DCT Coefficient Analysis," ECCV 2006, Part III, LNCS 3953, pp. 423-435.

Lukás, J. et al., "Estimation of Primary Quantization Matrix in Double Compressed JPEG Images," Proc. Digital Forensic Research Workshop 2003, pp. 1-17.

Mahdian, B. et al., "Detecting Double Compressed JPEG Images," Crime Detection and Prevention (ICDP 2009), 3rd International Conference, pp. 1-6.

Farid, H., "Detecting Digital Forgeries Using Bispectral Analysis," AI Lab, MIT, Tech. Rep. AIM-1657, 1999, pp. 1-9.

Popescu, A.C., et al., "Exposing Digital Forgeries by Detecting Traces of Re-sampling," Dept. Computer Science, Dartmouth College, Tech. Rep. TR2004-515,2004, pp. 1-23.

Popescu, A.C., "Statistical Tools for Digital Image Forensics," Ph.D. Thesis, Department of Computer Science, Dartmouth College, Hanover, New Hampshire, Dec. 2004.

Bianchi, T. et al., "Improved DCT Coefficient Analysis for Forgery Localization in JPEG Images," IEEE International Conference on Acoustics, Speech and Signal Processing (ICASSP), pp. 2444-2447.

Bianchi, T. et al., "Detection of Non-Aligned Double JPEG Compression Based on Integer Periodicity Maps," IEEE Transactions on Information Forensics and Security, vol. 7, No. 2, pp. 842-848.

Farid, H., "Image Forgery Detection," IEEE Signal Processing Magazine, Mar. 2009, pp. 16-25.

Fu, D. et al., "A Generalized Benford's Law for JPEG Coefficients and Its Applications in Image Forensics," In Security, Steganography, and Watermarking of Multimedia Contents IX, vol. 6505, p. 65051L, International Society for Optics and Photonics.

Nowroozi, E. et al., "Double JPEG Compression Detection Using Statistical Analysis," ACSIJ Advances in Computer Science: an International Journal, vol. 4, No. 15, Issue 3, pp. 70-76, May 2015.

Kee, E. et al., "Digital Image Authentication from JPEG Headers," IEEE Transactions on Information Forensics and Security, vol. 6, No. 3, pp. 1066-1075, 2011.

Jun. 16, 2020 Notice of Allowance Issued in U.S. Appl. No. 16/036,404.

\* cited by examiner

Fig. 1

100. Determine Single-Double Compression Differentiation Threshold T aka Resonance Threshold T for determining presence or absence of resonance in regions of image I (e.g. using method of Figs. 2 or 5 below or any other method, depending on use-case's criteria for successful detection).

110. Within the image I mark two rectangular regions: the FaceCrop region where the personal photograph is located, and a DocBody region that has no intersection with the FaceCrop region.

120. Compute DJPG features Face-DJPG-indicator F1 and Non-face-DJPG-indicator F2 for the FaceCrop and DocBody regions respectively (e.g. as per Fig. 3 below).

130. If resonance is deemed present outside of FaceCrop region but not in FaceCrop region, generate an output indication that a Photo Replacement forgery is suspected.

Fig. 2

210. Collect typical DJPG values F for both single and doubly compressed documents, e.g. by providing image sets 1 (single compressed or "authentic") and 2 (double compressed or "forged").

220. Compute DJPG feature values F for all the images in the single and double-compressed sets

230. Find a threshold T which optimally distinguishes between images in the single-compressed set on the one hand and images in the double-compressed set on the other hand.

Fig. 3

300: find value of threshold peak height V e.g. using the set-up method of Fig. 4 below.

↓

301. Convert the image sought to be tested for double JPEG compression (e.g. FaceCrop region), to a gray level image represented as an n x m matrix M1.

↓

302a. Generate a histogram of the DCT coefficients for M1.

↓

302b. Graph the magnitude of the Fourier transform of the DCT coefficient histogram generated in operation 302a.

↓

302c. By visual inspection of the graph generated in operation 302b, or automatically, find all peaks higher than threshold value V predetermined in operation 300 above.

↓

302d. Compute "before-disturb" DQ indicator f1 of the image by summing heights of all peaks found in operation 302c.

↓

303. Disturb or excise or cut or remove a column or row (or more) of the matrix M1 to convert n x m matrix M1 into an n x (m-1) matrix M2

↓

304. Compute "after-disturb" DQ indicator f2 for matrix M2 by repeating operations 302a – 302d on matrix M2 rather than on matrix M1.

↓

305. Compute Face-DJPG-indicator F1 = f1 / f2.

↓

306. To compute Non-face-DJPG-indicator F2, repeat operations 301 – 304 -- this time, using DocBody region (rather than FaceCrop region) as the image sought to be tested for double JPEG compression. Again compute the "before-disturb" DQ indicator f1 / "after-disturb" DQ indicator f2 ratio and this time, define f1 / f2 as Non-face-DJPG-indicator F2.

Fig. 4

4A. Generate graphs (e.g. a set of, say, a few hundred graphs) of Fourier transforms of histograms of DCT coefficients for gray level image matrices where the raw images corresponding to the graphs are JPEG-compressed and are typically a subset e.g. random sample of routine image traffic characterizing the anticipated use-case.

4B. heights of DCT coefficient histogram local maxima may be measured and/or noise level may be determined.

4C. Derive threshold V to differentiate between peaks (aka "genuine" peaks) and noise where local maxima are deemed noise if their height falls below threshold height V over which a local maximum is considered a peak.

Fig. 5

5a. Empirically determine values of threshold $T(Q)$ that correspond to various JPEG compression quality levels Q

5b. $T(Q)$ is monotonous as a function of Q, so interpolation between the $T(Q)$ values or any other smoothing or curve-fitting technique may be used to yield a function which computes thresholds $T(Q)$ for any quality level Q in segment [75, 100].

5c. Given any JPEG image, extract its quality level Q using any suitable programming tool and plug into the T function to obtain a resonance threshold T appropriate to this image.

SYSTEM, METHOD AND COMPUTER PROGRAM PRODUCT FOR ANALYZING JPEG IMAGES FOR FORENSIC AND OTHER PURPOSES

REFERENCE TO CO-PENDING APPLICATIONS

This application is a continuation of application Ser. No. 16/036,404 filed on Jul. 16, 2018, which claims the benefit of to Israeli Patent Application No. 253532 "System, method and computer program product for analyzing jpeg images for forensic and other purposes" filed on 17 Jul., 2017, the disclosures of which are hereby incorporated herein by reference in their entirety.

FIELD OF THIS DISCLOSURE

The present invention relates generally to image processing and more particularly to JPEG image analytics.

BACKGROUND FOR THIS DISCLOSURE

Digital forensic techniques are described inter alia in:
H. Farid. Photo Forensics. MIT Press, 2016.
H. Farid, "Detecting digital forgeries using bispectral analysis," *AI Lab, Massachusetts Institute of Technology*, Tech. Rep. AIM-1657, 1999.
A. C. Popescu and H. Farid, "Exposing digital forgeries by detecting duplicated image regions," Dept. Comput. Sci., Dartmouth College, Tech. Rep. TR2004-515, 2004
Alin C. Popescu, Statistical Tools for Digital Image Forensics, PhD thesis. Dartmouth College. Hanover, N.H. December, 2004.
PCT/IL2010/000932, PCT/IL2010/000933 and U.S. Pat. No. 9,406,030, co-owned.

In the past few decades, numerous image editing techniques have been developed. For example:
1. A. Agarwala et al. Interactive Digital Photomontage. *ACM Siggraph* 2004, pp. 294-301.
2. W. A. Barrett and A. S. Cheney. Object-Based Image Editing. *ACM Siggraph* 2002, pp. 777-784.
3. J. He, Zh. Lin, L. Wang2, and X. Tang. Detecting Doctored JPEG Images Via DCT Coefficient Analysis. ECCV 2006, Part III, LNCS 3953, pp. 423-435, 2006.

As a result, realistic synthetic images can be produced easily and cheaply.

Presence of Double JPEG Compression may be identified by computing an indicative feature or vector of features, aka DJPG feature/s. Various DJPG features have been proposed in the literature, e.g. as described in:
4. A. C. Popescu and H. Farid. Statistical Tools for Digital Forensics. *6th Int'l Workshop on Information Hiding*, Toronto, Canada, 2004.
5. J. Lukas and J. Fridrich. Estimation of Primary Quantization Matrix in Double Compressed JPEG Images, *Proc. Digital Forensic Research Workshop* 2003.
6. B. Mahdian and S. Saic. Detecting Double Compressed JPEG Images. Crime Detection and Prevention (ICDP 2009), 3rd International Conference, 1-6.

State of the art forgery detection and image forensics methods are described in:
H. Farid, "Detecting digital forgeries using bispectral analysis," A Lab, Massachusetts Institute of Technology, Tech. Rep. AIM-1657, 1999.
A. C. Popescu and H. Farid, "Exposing digital forgeries by detecting duplicated image regions," Dept. Comput. Sci., Dartmouth College, Tech. Rep. TR2004-515, 2004
Statistical Tools for Digital Image Forensics. PhD thesis by Alin C. Popescu, Dartmouth College, Hanover, N.H., December, 2004.

The disclosures of all publications and patent documents mentioned in the specification, and of the publications and patent documents cited therein directly or indirectly, are hereby incorporated by reference. Materiality of such publications and patent documents to patentability is not conceded.

SUMMARY OF CERTAIN EMBODIMENTS

Although modern image editing technologies enrich user experience and reduce production cost, the prevalence of convenient methods for realistic synthetic images also unfortunately results in prevalence of document forgeries. Therefore, technologies to determine whether the content of an image has been altered have become important. While not constituting a single algorithm universally effective for all kinds of images, a method for detecting doctored JPEG images e.g. JPEG files representing Photo Replacement forgeries or other local replacements, is useful, inter alia because JPEG is the most widely used image format.

Embodiments herein are also useful for barcode replacement forgeries, or indeed for any other doctoring (e.g. local replacement) forgery, e.g. when the location of "forger-prone" data such as photos, barcodes, date fields, etc. is known and it is desired to determine whether the data in that location has or has not been forged.

Certain embodiments of the present invention seek to determine whether or not a JPEG image was modified e.g. by a local replacement (replacement of some portion but not all).

Certain embodiments of the present invention seek to provide a convenient indicator of Double JPEG Compression hence of forgeries e.g. the F ratio described herein.

Certain embodiments of the present invention seek to provide a method for JPEG analytics, typically including Double Compression detection for JPEG files, typically including computing at least one, or only one parameter (aka DJPG feature) and making a decision by comparison of the feature to a threshold that typically depends on compression quality level.

The threshold may be found statistically, for example by resorting to machine learning in which there are two sets or classes of images: Set 1 (Single Compressed or "Authentic") and Set 2 (Double Compressed or "Forged"). Feature values for all the images are computed, thereby to yield two vectors of real values (for sets 1 and 2 correspondingly). Then, the two vectors (sets of values) are separated by a threshold which satisfies use-case specific "optimal" criteria. "Optimality" may for example be a standard logistic regression threshold which may match some desired balance between False Alarm and Misdetection rates. Or, optimality may demand selecting a threshold which provides an acceptably low level for false alarms, even if this means paying the price in terms of sub-optimal misdetection rates.

Certain embodiments of the present invention seek to provide processing circuitry comprising at least one processor in communication with at least one memory, with instructions stored in such memory executed by the processor to provide functionalities which are described herein in detail. Any functionality described herein may be firmware-implemented or processor-implemented, as appropriate.

The present invention typically includes at least the following embodiments:

Embodiment 1: A forensic method for identifying at least some forged documents, the method comprising, for each of a stream of incoming JPEG images from among which forgeries are to be identified:

using a processor configured for determining whether at least one individual JPEG image in the stream is a replacement forgery by determining whether a first portion of the individual image which resides at a known location (known as a location likely to be replaced by a forger) within at least the individual JPEG image has or has not been doctored aka replaced, including:

computing a double-compression indicator, aka face-DJPG aka F1, for the first portion at the known location;

computing a double-compression indicator, aka nonface-DJPG aka F2, for a second portion of the individual image which resides at a comparison location within the individual JPEG image which is known as a location unlikely to be replaced by a forger; and determining whether face-DJPG and nonface-DJPG fulfill at least one predetermined logical criterion and deciding whether or not the individual JPEG image is a replacement forgery accordingly.

The method is applicable for a wide variety of use cases in which specimens e.g. documents e.g. identity documents include: (a) at least one first portion, region or field residing at at least one respective known first location within the image, which is or are commonly replaced by forgers (in a forging process termed "local data replacement" in which a portion, but not the entirety, of the specimen is replaced by a forger); and (b) at least one second portion, region or field residing at at least one respective known second location within the image, which is or are not commonly replaced by forgers hence can be assumed not to have been replaced. So typically, the first portion is selected to be one that is likely to be replaced by forgers and the second portion is selected to be one that is unlikely to be replaced by forgers.

In the present specification, "head" (or "face") and "body" are sometimes used as shorthand to refer to first and second portions, respectively, of the specimen to be inspected for local replacement-type forgery of the first portion. This is because one example use case is identity documents in which the first location comprises a head/face photograph.

Embodiment 2. A method according to any of the preceding embodiments wherein the first portion comprises one of the following group: facial photograph, bar code, date field.

Embodiment 3. A method according to any of the preceding embodiments wherein the locations of the first and/or second portions is/are known from a data repository which stores knowledge regarding locations of specific image portions, in images with pre-known recognizable formats.

Embodiment 4. A method according to any of the preceding embodiments wherein the pre-known recognizable formats comprise at least one of: a country-specific and/or version specific passport format, a country-specific and/or version specific driving license, a financial institution-specific cheque format.

Embodiment 5. A method according to any of the preceding embodiments wherein the computing a double-compression indicator comprises, for at least one portion P (the first and/or second portions of the individual image):

a. computing a DQ (Double quantization) indicator in the portion P thereby to yield an f1 value, aka "before-disturb" DQ indicator;

b. disturbing the resonance of the portion P, thereby to generate a resonance-disturbed image, and re-computing the DQ indicator including computing the DQ indicator of the resonance-disturbed image thereby to yield an f2 value, aka "after-disturb" DQ indicator; and c. combining the "before-disturb" DQ indicator f1 and "after-disturb" DQ indicator f2 values thereby to yield the double-compression indicator, It is appreciated that the DQ indicator comprises any indicator of double quantization resulting from double JPEG compression.

Embodiment 6. A method according to any of the preceding embodiments wherein the disturbing comprises changing the number of instances of at least one row/column in the portion P.

Embodiment 7. A method according to any of the preceding embodiments wherein the disturbing comprises changing the number of instances of exactly one row/column from the portion P.

Embodiment 8. A method according to any of the preceding embodiments wherein the changing comprises removing at least one row/s, thereby to reduce the number of instances of at least one row from 1 to 0.

Embodiment 9. A method according to any of the preceding embodiments wherein the changing comprises adding at least one row/s.

Embodiment 10. A method according to any of the preceding embodiments wherein the locations of first and/or second portions is/are determined by finding location/s within the image possessing known characteristics of the portion/s.

Embodiment 11. A method according to any of the preceding embodiments wherein the portion's known characteristic is that the portion includes an image of a human face and wherein the finding location/s comprises performing automatic human face detection at plural locations in the image.

Embodiment 12. A method according to any of the preceding embodiments wherein the portion's known characteristic is that the portion includes a bar-code and wherein the finding location/s comprises performing automatic bar-code detection.

Embodiment 13. A method according to any of the preceding embodiments wherein the adding at least one row/s comprises duplicating at least one row/s, thereby to increase the number of instances of at least one row from one to at least two.

Embodiment 14. A method according to any of the preceding embodiments wherein the at least one logical criterion comprises whether or not face-DJPG and nonface-DJPG are on opposite sides of a predetermined resonance threshold T and whether face-DJPG and nonface-DJPG differ to a predetermined extent delta and wherein the deciding comprises deciding that the individual JPEG image is a replacement forgery if face-DJPG and nonface-DJPG are on opposite sides of resonance threshold T and face-DJPG and nonface-DJPG differ to predetermined extent delta.

Embodiment 15. A method according to any of the preceding embodiments wherein the combining comprises computing a ratio of the "before-disturb" DQ indicator f1 and "after-disturb" DQ indicator f2 values.

Embodiment 16. A method according to any of the preceding embodiments wherein the DQ indicator comprises a sum of peak heights computed over all peaks exceeding a predetermined threshold V, in a graph of a Fourier transform of a DCT coefficient histogram of a matrix representing a gray level image generated from an image or image portion to be tested for double JPEG compression.

Embodiment 17. A method for identifying double-compressed JPEG images, the method comprising:

determining whether at least one individual JPEG image is double-compressed by computing a double-compression indicator, aka F, including:
 a. computing a DQ indicator in the image thereby to yield an f1 value, aka "before-disturb" DQ indicator;
 b. disturbing the resonance of the image thereby to generate a resonance-disturbed image and re-computing the DQ indicator including computing the DQ indicator of the resonance-disturbed image thereby to yield an "after-disturb" DQ indicator f2 value, aka "after-disturb" DQ indicator; and
 c. combining the "before-disturb" DQ indicator f1 and "after-disturb" DQ indicator f2 values thereby to yield the double-compression indicator; and determining whether F fulfills at least one predetermined logical criterion and deciding whether or not the at least one individual JPEG image is double-compressed accordingly.

Embodiment 18. A method according to any of the preceding embodiments wherein the combining comprises computing a ratio of "before-disturb" DQ indicator f1 and "after-disturb" DQ indicator f2 and the logical criterion comprises that the ratio is predeterminedly distant from 1.

Embodiment 19. A forensic system for identifying at least some forged documents, the system comprising:

a processor configured to perform, for each of a stream of incoming JPEG images from among which forgeries are to be identified:
 determining whether at least one individual JPEG image in the stream is a replacement forgery by determining whether a first portion of the individual image which resides at a known location (known as a location likely to be replaced by a forger) within at least the individual JPEG image, has or has not been doctored aka replaced, including:
  computing a double-compression indicator, aka face-DJPG aka F1, for the first portion at the known location;
  computing a double-compression indicator, aka nonface-DJPG aka F2, for a second portion of the individual image which resides at a comparison location within the individual JPEG image which is known as a location unlikely to be replaced by a forger; and
  determining whether face-DJPG and nonface-DJPG fulfill at least one predetermined logical criterion, and deciding whether or not the individual JPEG image is a replacement forgery accordingly.

Embodiment 20. A computer program product, comprising a non-transitory tangible computer readable medium having computer readable program code embodied therein, the computer readable program code adapted to be executed to implement a forensic method for identifying at least some forged documents, the method comprising, for each of a stream of incoming JPEG images from among which forgeries are to be identified:

using a processor configured for determining whether at least one individual JPEG image in the stream is a replacement forgery by determining whether a first portion of the individual image which resides at a known location (known as a location likely to be replaced by a forger) within at least the individual JPEG image, has or has not been doctored aka replaced, including:
 computing a double-compression indicator, aka face-djpg aka F1, for the first portion at the known location;
 computing a double-compression indicator, aka nonface-DJPG aka F2, for a second portion of the individual image which resides at a comparison location within the individual JPEG image which is known as a location unlikely to be replaced by a forger; and
 determining whether face-DJPG and nonface-DJPG fulfill at least one predetermined logical criterion and deciding whether or not the individual JPEG image is a replacement forgery accordingly.

It is appreciated that in an original, doubly compressed image, resonance (aka DQ effect or double quantization effect) may be present in all regions. If a forger inserts her or his rectangular region into the image, statistically, the inserted (replaced) region will almost always be misaligned relative to the JPEG grid of the non-inserted region. If indeed, the inserted (replaced) region is misaligned relative to the JPEG grid of the non-inserted ("docBody") region, the resonance structure (aka resonance or DQ effect) may be destroyed in the replaced region but preserved elsewhere (e.g. in the DocBody region). Therefore, if a feature F is computed, which measures "likelihood" of resonance in a region, both within the replacement region and the DocBody region, this is useful for, statistically, distinguishing authentic images from replacement forgeries, because a considerable difference in the F feature in the two regions is expected for forgeries, whereas if no replacement forgery has been perpetrated, resonance is maintained in both regions, hence no significant difference between F values is expected.

According to certain embodiments, the resonance is intentionally disturbed and a before-after comparison is conducted e.g. by computing a parameter F which is a ratio between:

sum of peak heights (in graph of Fourier transform of gray-level DCT coefficient histogram) before resonance is disturbed, and sum of peak heights (in graph of Fourier transform of gray-level DCT coefficient histogram) after resonance is disturbed.

According to certain embodiments a method for determining whether a JPEG file is single- or double-compressed is provided. Typically, a column is removed from the initial JPEG file to destroy resonance structure aka resonance or DQ effect, if any, present in the initial JPEG file which may or may not have been double-compressed. This (or any other suitable resonance-disturbing operation) generates a resonance-disturbed image. Next, the "cut" image (the resonance-disturbed image from which a single (say) column or row has been cut/removed/excised, or added, or modified) is compressed to a JPEG file that obviously carries no resonance, being a single compression. Finally, a comparison of this singly-compressed JPEG file's F feature to the feature F of the initial JPEG file is conducted. If the two compared F features are close, the initial file is single compressed, whereas if the two compared F features are distant, the initial file is double compressed.

Also provided are the following embodiments:

Embodiment 101. A forensic method for determining whether a known location within a JPEG image has or has not been doctored, the method comprising:

providing a JPEG image in which:
 a portion of the image whose location is known, may or may not have been doctored (replaced and subsequently JPEG-recompressed) thereby to yield a double-compressed portion at a JPEG compression quality level $q_2$ and the remaining portions are assumed not to have been replaced hence are assumed to be single-compressed at a jPEG compression quality level $q_1$, and determining whether the known location within the JPEG image has or has not been doctored, by determining whether or not there is a difference between $q_1$ and $q_2$.

Embodiment 102. A method according to any preceding embodiment wherein the portion comprises one of the following group: facial photograph, bar code or date field.

Embodiment 103. A method according to any preceding embodiment wherein the location is known from a data repository which stores knowledge regarding locations of specific image portions, in images with pre-known recognizable formats.

Embodiment 104. A method according to any preceding embodiment wherein the image comprises a financial document and the pre-known recognizable formats comprise at least one of: a country-specific and/or version specific passport format, a country-specific and/or version specific driving license, a financial institution-specific cheque format.

Embodiment 105. A method according to any preceding embodiment wherein the determining comprises
a. Computing f in the image thereby to yield an "before-disturb" DQ indicator f1 value;
b. disturbing the resonance of the image and recomputing f thereby to yield an "after-disturb" DQ indicator f2 value;
c. if "before-disturb" DQ indicator f1 and "after-disturb" DQ indicator f2 are dissimilar e.g. their ratio is predeterminedly far from 1, generate an output indication that the known location has been doctored and/or if "before-disturb" DQ indicator f1 and "after-disturb" DQ indicator f2 are similar, .g. their ratio is predeterminedly close to 1, generate an output indication that the known location has not been doctored.

Embodiment 106. A method according to any preceding embodiment wherein the disturbing comprises changing the number of instances of at least one row/column in the image.

Embodiment 107. A method according to any preceding embodiment wherein the disturbing comprises changing the number of instances of exactly one row/column from the image.

Embodiment 108. A method according to any preceding embodiment wherein the changing comprises removing at least one row/s, thereby to reduce the number of instances of at least one row from 1 to 0.

Embodiment 109. A method according to any preceding embodiment wherein the changing comprises adding at least one row/s.

Embodiment 110. A method according to any preceding embodiment wherein the location is known because the portion's characteristics have been automatically detected at a location within the image.

Embodiment 111. A method according to any preceding embodiment wherein the portion is known to include an image of a human face whose location has been determined by performing automatic human face detection.

Embodiment 112. A method according to any preceding embodiment wherein the portion is known to include a bar-code whose location has been determined by performing automatic bar-code detection.

Embodiment 113. A method according to any preceding embodiment wherein the adding at least one row/s comprises duplicating at least one row/s, thereby to increase the number of instances of at least one row from 1 to at least 2.

Also provided, excluding signals, is a computer program comprising computer program code means for performing any of the methods shown and described herein when the program is run on at least one computer; and a computer program product, comprising a typically non-transitory computer-usable or -readable medium e.g. non-transitory computer-usable or -readable storage medium, typically tangible, having a computer readable program code embodied therein, the computer readable program code adapted to be executed to implement any or all of the methods shown and described herein. The operations in accordance with the teachings herein may be performed by at least one computer specially constructed for the desired purposes or general purpose computer specially configured for the desired purpose by at least one computer program stored in a typically non-transitory computer readable storage medium. The term "non-transitory" is used herein to exclude transitory, propagating signals or waves, but to otherwise include any volatile or non-volatile computer memory technology suitable to the application.

Any suitable processor/s, display and input means may be used to process, display e.g. on a computer screen or other computer output device, store, and accept information such as information used by or generated by any of the methods and apparatus shown and described herein; the above processor/s, display and input means including computer programs, in accordance with some or all of the embodiments of the present invention. Any or all functionalities of the invention shown and described herein, such as but not limited to operations within flowcharts, may be performed by any one or more of: at least one conventional personal computer processor, workstation or other programmable device or computer or electronic computing device or processor, either general-purpose or specifically constructed, used for processing; a computer display screen and/or printer and/or speaker for displaying; machine-readable memory such as optical disks, CDROMs, DVDs, BluRays, magnetic-optical discs or other discs; RAMs, ROMs, EPROMs, EEPROMs, magnetic or optical or other cards, for storing, and keyboard or mouse for accepting. Modules shown and described herein may include any one or combination or plurality of: a server, a data processor, a memory/computer storage, a communication interface, a computer program stored in memory/computer storage.

The term "process" as used above is intended to include any type of computation or manipulation or transformation of data represented as physical, e.g. electronic, phenomena which may occur or reside e.g. within registers and/or memories of at least one computer or processor. The term processor includes a single processing unit or a plurality of distributed or remote such units.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may, wherever suitable, operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of at least one computer/s or computing system/s, or processor/s or similar electronic computing device/s, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, embedded cores, computing system, communication devices, processors (e.g. digital signal processor (DSP), microcontrollers, field programmable gate array (FPGA), application specific integrated circuit (ASIC), etc.) and other electronic computing devices. Any reference to a computer, controller or processor is intended to include one or more hardware devices e.g. chips, which may be co-located or remote from one another.

The present invention may be described, merely for clarity, in terms of terminology specific to, or references to, particular programming languages, operating systems, browsers, system versions, individual products, protocols and the like. It will be appreciated that this terminology or such reference/s is intended to convey general principles of operation clearly and briefly, by way of example, and is not intended to limit the scope of the invention solely to a particular programming language, operating system, browser, system version, or individual product or protocol. Nonetheless, the disclosure of the standard or other professional literature defining the programming language, operating system, browser, system version, or individual product or protocol in question, is incorporated by reference herein in its entirety.

Elements separately listed herein need not be distinct components and alternatively may be the same structure. A statement that an element or feature may exist is intended to include (a) embodiments in which the element or feature exists; (b) embodiments in which the element or feature does not exist; and (c) embodiments in which the element or feature exist selectably e.g. a user may configure or select whether the element or feature does or does not exist.

Any suitable input device, such as but not limited to a sensor, may be used to generate or otherwise provide information received by the apparatus and methods shown and described herein. Any suitable output device or display may be used to display or output information generated by the apparatus and methods shown and described herein. Any suitable processor/s may be employed to compute or generate information as described herein and/or to perform functionalities described herein and/or to implement any engine, interface or other system described herein. Any suitable computerized data storage e.g. computer memory may be used to store information received by or generated by the systems shown and described herein. Functionalities shown and described herein may be divided between a server computer and a plurality of client computers. These or any other computerized components shown and described herein may communicate between themselves via a suitable computer network.

BRIEF DESCRIPTION OF THE DRAWINGS

Certain embodiments of the invention are illustrated in the following drawings:

FIG. 1 is a simplified flowchart illustration of a method for identifying local (e.g. facial photo) Replacement forgery in JPEG-compressed image I in an incoming stream of images for which replacement-forgery detection is to be performed for a given region FIG. 2 is a simplified flowchart illustration of a first method for performing operation [100] of FIG. 1—determining threshold T for image I FIG. 3 is a simplified flowchart illustration of a method for performing operation b of FIG. 1—Compute DJPG feature for FaceCrop region and for DocBody region (Face-DJPG-indicator F1 and Non-face-DJPG-indicator F2 respectively)

FIG. 4 is a simplified flowchart illustration of a method for finding threshold peak height V e.g. in the service of FIG. 3, operation 3

FIG. 5 is a simplified flowchart illustration of a second method for performing operation [100] of FIG. 1—determining threshold T for image I.

Figure 6:
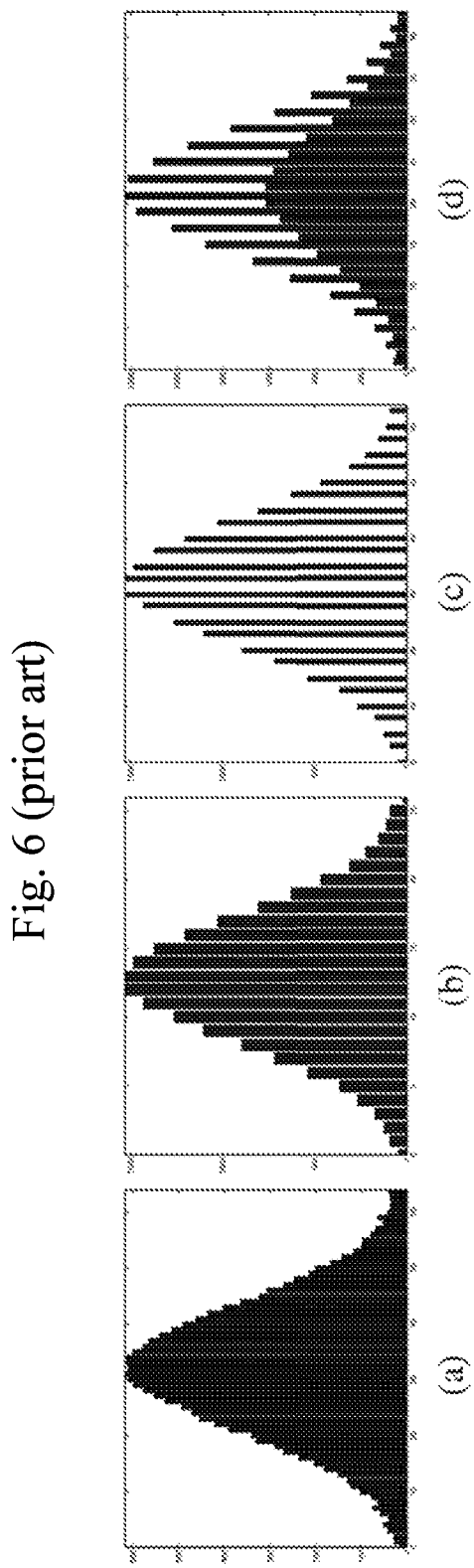
Figure 7:
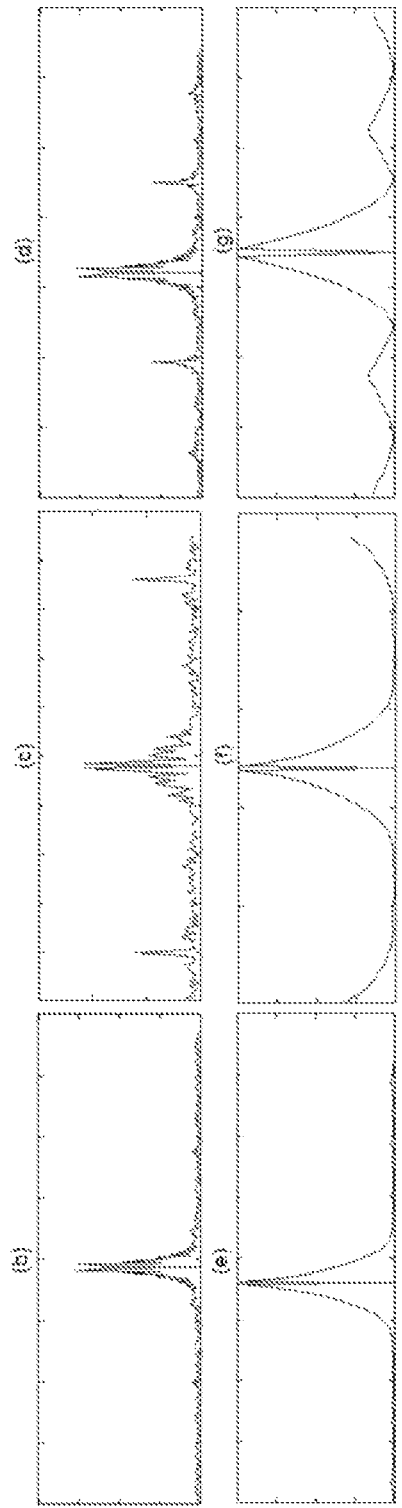

Prior art FIGS. 6, 7 (available in H. Farid. Photo Forensics. MIT Press, 2016) illustrate how $h_1$ changes after double quantization.

It is noted that: FIG. 1 is a simplified flowchart some or all of which may be provided in any suitable order e.g. as shown; it is appreciated that the operations of FIG. 1 may be replaced with the operations of Method A and vice versa, as desired.

The method of FIG. 2 is useful inter alia to implement operation a of Method A or operation 100 of FIG. 1.

FIG. 3 is a simplified flowchart some or all of which may be provided in any suitable order e.g. as shown; it is appreciated that the operations of FIG. 1 may be replaced with the operations of Method B and vice versa, as desired. The method of FIG. 3 (or method B) are useful inter alia to implement operation b of Method A or operation 120 of FIG. 1.

The method of FIG. 4 is useful inter alia to generate threshold v used in operation 2c of Method B or to implement operation 300 of FIG. 3.

The method of FIG. 5 is useful inter alia to implement operation a of Method A or operation 100 of FIG. 1.

Methods and systems included in the scope of the present invention may include some (e.g. any suitable subset) or all of the functional blocks shown in the specifically illustrated implementations by way of example, in any suitable order e.g. as shown.

Computational, functional or logical components described and illustrated herein can be implemented in various forms, for example, as hardware circuits such as but not limited to custom VLSI circuits or gate arrays or programmable hardware devices such as but not limited to FPGAs, or as software program code stored on at least one tangible or intangible computer readable medium and executable by at least one processor, or any suitable combination thereof. A specific functional component may be formed by one particular sequence of software code, or by a plurality of such, which collectively act or behave or act as described herein with reference to the functional component in question. For example, the component may be distributed over several code sequences such as but not limited to objects, procedures, functions, routines and programs and may originate from several computer files which typically operate synergistically.

Each functionality or method herein may be implemented in software, firmware, hardware or any combination thereof. Functionality or operations stipulated as being software-implemented may alternatively be wholly or fully implemented by an equivalent hardware or firmware module and vice-versa. Firmware implementing functionality described herein, if provided, may be held in any suitable memory device and a suitable processing unit (aka processor) may be configured for executing firmware code. Alternatively, certain embodiments described herein may be implemented partly or exclusively in hardware in which case some or all of the variables, parameters, and computations described herein may be in hardware.

Any module or functionality described herein may comprise a suitably configured hardware component or circuitry. Alternatively or in addition, modules or functionality described herein may be performed by a general purpose computer or more generally by a suitable microprocessor, configured in accordance with methods shown and described herein, or any suitable subset, in any suitable order, of the operations included in such methods, or in accordance with methods known in the art.

Any logical functionality described herein may be implemented as a real time application if and as appropriate and which may employ any suitable architectural option such as but not limited to FPGA, ASIC or DSP or any suitable combination thereof.

Any hardware component mentioned herein may in fact include either one or more hardware devices e.g. chips, which may be co-located or remote from one another.

Any method described herein is intended to include within the scope of the embodiments of the present invention also any software or computer program performing some or all of the method's operations, including a mobile application, platform or operating system e.g. as stored in a medium, as well as combining the computer program with a hardware device to perform some or all of the operations of the method.

Data can be stored on one or more tangible or intangible computer readable media stored at one or more different locations, different network nodes or different storage devices at a single node or location.

It is appreciated that any computer data storage technology, including any type of storage or memory and any type of computer components and recording media that retain digital data used for computing for an interval of time, and any type of information retention technology, may be used to store the various data provided and employed herein. Suitable computer data storage or information retention apparatus may include apparatus which is primary, secondary, tertiary or off-line; which is of any type or level or amount or category of volatility, differentiation, mutability, accessibility, addressability, capacity, performance and energy use; and which is based on any suitable technologies such as semiconductor, magnetic, optical, paper and others.

DETAILED DESCRIPTION OF CERTAIN EMBODIMENTS

According to one embodiment of the present invention, a process including some or all of the following operations p1, p2, . . . , suitably ordered e.g. as follows, may be performed:

P1. some or all incoming JPEG images in a stream are checked to determine whether or not they are doubly compressed.

P2. If not, end e.g. JPEG proceed to next JPEG image—or proceed to other forgery checks or other processes performed on the current image, that are outside the scope of the present invention.

P3. For each or some JPEG images found to be doubly compressed generally, at least one region in the image is identified which is to be checked to determine whether that region is singly compressed. For example, the region may be identified if a face is detected at a certain location within the image and, typically, if the location containing the face is of reasonable minimum size e.g. of the size devoted to a face-photo in most conventional identity documents. Or, the jpeg image's category (e.g. country and type and series of identity document) may be known (e.g. by employing known technologies such as those described in co-owned patent documents PCT/IL2010/000932 or '933, or U.S. Pat. No. 9,406,030).

and prior knowledge may be available regarding the location of a photograph in each particular type of document P4. Determine whether the region ("face") identified in operation p3, is indeed single-compressed, typically by comparison to another region ("body" or non-face). If so, alert that the jpeg image is forged/includes a photograph-replacement or other replacement forgery.

It is appreciated that any of the methods shown and described herein (A, B, FIGS. 1-5) may be used, in the service of the above process, to identify photo replacement forgeries e.g. to determine whether a region identified in operation p3 in a double-compressed jpeg image identified in operation p1, has been replaced.

A typical Photo Replacement forgery scenario may be this: There is a JPEG-image I (of compression quality $q_1$), e.g. an identity document or financial document, that a forger seeks to alter by using a graphical editor to replace a photograph of a person within JPEG-image $I_1$ by another photograph of similar size from another image $I_2$. The forger copies (CTRL-C) the photograph block from image $I_2$ and pastes (CTRL-V) the photograph block into image I in place of the original photograph. Subsequently, the altered file is saved as a JPEG file, but normally, the "altered JPEG file" has a compression quality $q_2$ which is not equal to $q_1$. People e.g. forgers saving an image e.g. a doctored image, usually do not care about the relation between former and updated compression quality levels $q_1$ and $q_2$ and do not bother to match or equalize the JPEG compression quality level of the doctored portion q2 of the JPEG compression quality level q1 of the original pre-doctored image. Instead, forgers choose $q_2$ (if at all) due to other reasons and not to equalize with q1.

The altered file is also termed herein a "doctored" image which is intended to include any image characterized in that a portion e.g. region of the content has been altered e.g. replaced by synthesized or copied data—as opposed to wholly synthesized images, entirely rendered by computer graphics or texture synthesis, which may of course themselves be forgeries from beginning to end. It is appreciated that an image that has been doctored has, by definition, two parts, one undoctored part and one which is doctored. In Photo Replacement forgeries, the photo is "doctored" and the remaining portions e.g. regions of the identity document, are assumed to be un-doctored.

Formally, the image forgery process is assumed to include these operations:
1. Load a JPEG-compressed ("first compression") image $I_1$.
2. Replace a region of $I_1$ by pasting a region from another JPEG compressed image $I_2$.
3. Save the forged image in JPEG format ("second compression").

Method A

Method A provided according to certain embodiments and including some or all of operations a, b, c in any suitable order e.g. as shown, is now described in detail.

As is known in the literature, doctored JPEG images e.g. photo replacement forgeries may be detected by double compression analysis e.g. detection of presence of double compression in an image.

Conventional encoding (compression) of a JPEG image typically includes:
1. Discrete cosine transform (DCT):
  1a. An image is first divided into e.g. partitioned into "blocks" aka DCT (Discrete Cosine Transform) blocks e.g. groups of pixels e.g. 8×8 windows within the pixel matrix of the image, The DCT "grid" includes the horizontal and vertical lines that partition the image into these blocks.
  1b. Each block's entry (intensity) is decremented by 128 and transformed to the YUV color space.
  1c. Finally, DCT is applied to each channel of the block.
2. Quantization: the DCT coefficients are divided by a quantization step and rounded to the nearest integer. The quantization step may be different for different frequencies and different channels. Results of the quantization steps for plural frequencies may be stored in plural respective quantization matrices. The quantization matrices may be retrieved from the JPEG image. The higher the compression quality is, the smaller the quantization step will be, whereas the lower the compression quality is, the larger the quantization step will be.
3. Entropy coding: lossless entropy coding (e.g. Huffman coding) of quantized DCT coefficients.

Decompression or decoding of a JPEG image involves the same operations in reverse order: entropy decoding, de-quantization, and inverse Discrete cosine transform (IDCT).

A method "method A" for identifying Photo Replacement forgeries e.g. generated by the above scenario, may include some or all of the following operations, suitably ordered e.g. as follows:
a. Within the image $I_1$ mark two rectangular regions: the FaceCrop region where the personal photograph is located, and a DocBody region typically of same or similar or larger size that has no intersection with the FaceCrop region. Both regions may be selected such that one of their corners, e.g. their left upper corners, have pixel coordinates of the form (8m+1, 8n+1) ensuring that the corners lie at nodes of the DCT (Discrete Cosine Transform) grid used to JPEG-compress the image $I_1$. It is appreciated that this is possible because typically, the location of the possible replaced region is known beforehand, since forgers are prone to replace photographs, which may be automatically (or manually) detected, e.g. as to their location, within an identity document. Methods for automatic human face detection in an image include, for example, the Viola-Jones method. Also, the format of the incoming images (e.g. of the types of identity documents that are flowing in) may be known in certain use cases, including the locations of regions aka image portions that are prone to being forged, such as head photos or bar-codes.

The FaceCrop region may for example be the minimum rectangle that incorporates the photo region, with left upper corner in point (8m+1, 8n+1), thereby to ensure that corners are positioned exactly at (8m+1, 8n+1).
b. Compute DJPG features $F_1$ (aka Face-DJPG-indicator) and $F_2$ (aka non-Face-DJPG-indicator) for the FaceCrop and DocBody regions respectively e.g. by computing feature values $F=f_1/f_2$ (DJPG feature performing operations 1-5 of method B described herein below, for at least one tested document.
c. If Non-face-DJPG-indicator F2>T but Face-DJPG-indicator F1<T, this indicates that the initial image as a whole was Double Compressed (once before doctoring and once thereafter), because Non-face-DJPG-indicator F2>T, whereas the FaceCrop or photograph region has undergone Single Compression (since Face-DJPG-indicator F1<T). Therefore, generate an output indication that a Photo Replacement forgery is suspected. Otherwise, an output indication that no Photo Replacement forgery is suspected may be generated. End.

It is appreciated that for Photo Replacement forgery of this kind, Face-DJPG-indicator F1<T with probability P=63/64 because when a forger pastes a photo rectangle into a document, the upper left corner of the rectangle impinges upon a pixel within the document. There are 64 entries in a DCT block and there is a 63/64 chance that a forger's rectangle does not impinge upon the upper left corner.

Method B provided according to certain embodiments and including some or all of operations 1-5 in any suitable order e.g. as shown, is now described in detail.

It is appreciated that presence of Double JPEG Compression may be identified by computing an indicative feature or vector of features, aka DJPG feature/s. Various DJPG features have been proposed in the literature.

In Popescu and Farid (Statistical Tools for Digital Forensics) and in Lukas and Fridrich (Estimation of Primary Quantization Matrix in Double Compressed JPEG Images), a Double JPEG Compression (DJPG) detection method is presented, which is based on detecting the Double Quantization (DQ) effect which is known to result from double JPEG compression.

Turning now to the quantization stage of the JPEG process, if two successive JPEG compressions act on the same 8×8-grid of the DCT blocks, then effects of both quantization operations are known to form a "resonance-like" phenomenon aka "the DQ effect". Denote by $h_1$ and $h_2$, the histograms of DCT coefficients of a frequency before the first quantization (that of the first JPEG compression) and after the second quantization (that of the second JPEG compression), respectively.

Prior art FIGS. 6, 7 (available in H. Farid. Photo Forensics. MIT Press, 2016) illustrate how $h_1$ changes after double quantization. In prior art FIG. 6, graphs a and b are histograms of single quantized signals; see e.g. operation 2a in Method B as described below. Quantization is a point-wise operation that is described by a one parameter family of functions e.g.

$$q_a(u) = \left\lfloor \frac{u}{a} \right\rfloor,$$

where a is the quantization step (a strictly positive integer), and $\lfloor x \rfloor$ denotes the maximum integer value not exceeding x. Graphs c and d are histograms of double quantized signals; see e.g. operation 5 followed by operation 2c in Method B as described below. It is appreciated that periodic artifacts (phenomena that arise in periodic order, e.g. zero or low height bins which may be seen in the histograms) occur in graphs c and d—the histograms of double quantized signals. These periodic artifacts are visible to a human viewer or may be detected automatically, e.g. by computing the magnitude of the Fourier transform of the histogram. Any periodicity in the histogram will manifest itself as spikes in the Fourier domain.

In FIG. 7, graphs (b) and (e) show the magnitudes of Fourier transform of the zero-mean histograms of DCT coefficients corresponding to frequencies (0, 0) and (1, 1) obtained from a single compressed version of the histogram of FIG. 6, graph (a). Here the image was saved by quality factor 85. Still in FIG. 7, graphs (c) and (f) show the magnitudes of Fourier transform of the zero-mean histograms of DCT coefficients corresponding to frequencies (0, 0) and (1, 1) obtained from the double compressed version of prior art FIG. 6's graph (a) where the image was saved by quality factor 85 followed by quality factor 75. In prior art FIG. 7, graphs (d) and (g) show magnitudes of Fourier transform of the zero-mean histograms of DCT coefficients corresponding to frequencies (0, 0) and (1, 1) obtained from the double compressed version of prior art FIG. 6's graph (a), this time with quality factor 85 followed by quality factor 80.

In the conventional Double JPEG Compression (DJPG) detection method based on detecting the Double Quantization (DQ) effect, the DJPG feature may be a characteristic of peaks in the graph of the Fourier images' magnitude e.g. as shown in prior art FIG. 7—e.g. the number of "considerable" (above threshold) peaks, computing energy of the peaks (area under appropriate segments of the graph) and so on. However, the features proposed in the literature are not invariant of image properties such as size, quality, and mean luminosity. Therefore, use of these DJPG features can yield an unacceptably high rate of false alarms and/or misdetections, when the images being examined are very diverse in terms of image properties such as size, quality, and mean luminosity.

Method B

The following method B (aka DJPG Feature method or "Section 2 flowchart" method) may be used, according to certain embodiments of the present invention, to provide a particularly convenient DJPG feature, aka DPEG indicator, aka the "$F=f_1/f_2$ ratio", which is indicative of Double JPEG Compression hence of forgeries, and also has been found to be invariant of image properties like size, quality, and mean luminosity. The method includes any or all of the following operations, suitably ordered e.g. as follows:

Operation 1: convert the image sought to be tested for double JPEG compression to a gray level image, thereby to yield a gray level image represented as an n×m matrix $M_1$.

Assume n<=m.

Operation 2a. generate a histogram of the DCT coefficients for $M_1$.

Operation 2b. graph the magnitude of the Fourier transform of the DCT coefficient histogram generated in operation 2a.

Operation 2c. by visual inspection of the graph generated in operation 2b, or automatically, find all peaks higher than a predetermined typically constant threshold value V, to distinguish genuine peaks from what is deemed to be the noise level.

Operation 2d. compute feature $f_1$ (aka "before-disturb" DQ indicator f1) of the image by summing heights of the all peaks found in operation 2c.

Operation 3. excise or cut or remove a column or row of the matrix $M_1$ (e.g. the first column thereof) thereby to convert the n×m matrix $M_1$ into an n×(m−1) matrix $M_2$. Alternatively, a few rows or columns might be excised or removed, such as 2-7 rows or even more, as long as the number of removed rows or columns is not an integer multiple of the DCT block size (e.g. as long as the number of removed rows or columns is not 8, 16 etc. if the DCT blocks are 8×8 in size. However, typically, removing only one row or column is both sufficient and yields better results.

Operation 4. compute "after-disturb" DQ indicator f2 for matrix $M_2$ by repeating operations 2a-2d on matrix $M_2$ rather than on matrix $M_1$.

Operation 5. compare values of features "before-disturb" DQ indicator f1 and "after-disturb" DQ indicator f2 e.g. by computing the ratio $F=f_1/f_2$ (DJPG feature) and comparing that ratio to a threshold ratio T (aka Single-Double Compression Differentiation Threshold T (aka Resonance Threshold T). If F>T then the image is declared Double Compressed, otherwise the image is deemed to be Single Compressed. It is appreciated, here and elsewhere in the disclosure, that comparisons need not necessarily be operationalized as ratios and instead may for example be operationalized using subtraction. However, for many use cases, ratios are invariant and effective.

It is appreciated that matrices $M_1$ and $M_2$ differ by (say) a single column (row) only, and indeed, typically, the images corresponding thereto look almost the same. It is found that if the initial image (matrix $M_1$) was single compressed, the values of "before-disturb" DQ indicator f1 and "after-disturb" DQ indicator f2 are close to one other. In contrast, if the initial image (matrix $M_1$) was double compressed, "before-disturb" DQ indicator f1 will be high whereas "after-disturb" DQ indicator f2 remains low. This is believed to occur because the shift by one column (row) in matrix $M_2$ by moving the DCT grid, destroyed the DJPG resonance which occurs if two successive quantizations, e.g. required for two successive JPEG compressions, act on the same 8×8-grid of the DCT blocks. This is believed to be why a large ratio F is indicative of double compression, whereas a ratio F, which is close to 1, is indicative of single compression. f1, f2 become dissimilar, if the resonance is destroyed because Face-DJPG-indicator F1 was computed PRIOR to the resonance destruction, whereas Non-face-DJPG-indicator F2 was computed thereafter.

FIGS. 1-5 illustrate JPEG image analysis methods constructed and operative in accordance with certain embodiments. It is appreciated that presence of Double JPEG Compression may be identified by computing an indicative feature or vector of features, aka DJPG feature/s. Various DJPG features have been proposed in the literature.

In Popescu and Farid (Statistical Tools for Digital Forensics) and in Lukas and Fridrich (Estimation of Primary Quantization Matrix in Double Compressed JPEG Images), a Double JPEG Compression (DJPG) detection method is presented, which is based on detecting the Double Quantization (DQ) effect known to result from double JPEG compression.

Turning now to the quantization stage of the JPEG process, if two successive JPEG compressions act on the same 8×8-grid of the DCT blocks, then effects of both quantization operations are known to form a "resonance-like" phenomenon, aka "the DQ effect". Denoted by $h_1$ and $h_2$, the histograms show DCT coefficients of a frequency before the first quantization (that of the first JPEG compression) and after the second quantization (that of the second JPEG compression), respectively.

In an original, doubly compressed image, resonance is present in all regions. If a forger inserts his rectangular region into the image, statistically, the inserted (replaced) region will almost always be misaligned relative to the JPEG grid of the non-inserted region. If indeed, the inserted (replaced) region is misaligned relative to the JPEG grid of the non-inserted (docBody) region, the resonance structure will be destroyed in the replaced region but preserved elsewhere (e.g. in the DocBody region). Therefore, upon computation of the feature F, which measures "likelihood" of resonance in a region, both within the replacement region and the DocBody region, it is possible, statistically, to distinguish authentic images from replacement forgeries, because a considerable difference in the F feature in the two regions is expected for forgeries, whereas if no replacement forgery has been perpetrated, resonance is maintained in both regions hence no significant difference between F values is expected.

According to certain embodiments, removing one column is as described herein as one way of destroying the resonance structure if any, of an initial JPEG file. Afterwards the "cut" image may be compressed to a JPEG file which of course has no resonance being a single, not double, compressed file. Therefore, this JPEG file's DPJG feature F is comparable to the DPJG feature F of the initial JPEG file; if the respective DPJG features F are close, the initial file is deemed single compressed, otherwise the initial JPEG file is deemed to be double compressed.

Turning now to FIG. 1, according to certain embodiments, column excision or any other suitable operation to disturb resonance is applied to face and body portions. Then, a before-after resonance disturbance comparison is conducted e.g. a before excision/after excision ratio F is computed (e.g. F for "face"/F for "body"). If the F for the face differs from F for the body, the image is deemed to be forged.

The term "face" is used herein to include any region in the image which is suspected of having been replaced; a common example of a "face" region is a region of an image of an identity document, known to contain a photograph of the bearer of the identity document. The term "body" or non-face is used to denote any region in the image which is not suspected of having been replaced and therefore may serve as a "control" to which the "face" or suspect region may be compared. Typically, the "body" region is selected to be rectangular, to simplify computations. The "body" region may for example be selected as the largest rectangle in the JPEG-compressed image which does not overlap or include the "face" and, typically, also does not include border pixels e.g. pixels which are 0.03D or 0.05D or n %×D away from the image's edge, where D is the image's dimension/size. Even if the "body" region includes a small, relative to its total size and/or relative to the "face" size, area that may have been replaced e.g. one or a few alphanumeric characters in a typically sized date field in a typical identity document, this typically does not adversely affect results. Such small replacements may if desired be separately detected using suitable techniques outside the scope of the present inventions.

According to certain embodiments, the method of FIG. 1 includes any subset of or all of the following operations, suitably ordered e.g. as shown:

100. Determine Single-Double Compression Differentiation Threshold T aka Resonance Threshold T for determining presence or absence of resonance in regions of image I (e.g. using method of FIG. 2 or 5 below or any other method, depending on use-case's criteria for successful detection).

110. Within the image I mark two rectangular regions: the FaceCrop region where the personal photograph is located, and a DocBody region typically of same or similar or larger size that has no intersection with the FaceCrop region. Both regions are selected such that one of their corners, e.g. their left upper corners, has pixel coordinates of the form (8m+1, 8n+1) ensuring that the corners lie at nodes of the DCT (Discrete Cosine Transform) grid.

120. Compute DJPG features Face-DJPG-indicator F1 and Non-face-DJPG-indicator F2 for the FaceCrop and DocBody regions respectively (e.g. as per FIG. 3 below).

130. If Non-face-DJPG-indicator F2>T (indicating resonance is present outside of FaceCrop region) but Face-DJPG-indicator F1<T (indicating no resonance in FaceCrop region), and F2-F1>delta (statistically ruling out random error) then the doc is declared forged e.g. because the combination of the above three constraints may indicate that the initial image as a whole was Double Compressed (once before doctoring, and once thereafter), because Non-face-DJPG-indicator F2>T, whereas the FaceCrop or photograph region has undergone Single Compression (since Face-DJPG-indicator F1<T) or if double compressed, the double-compression resonance or double-compression structure has been destroyed. Therefore, generate an output indication that a Photo Replacement forgery is suspected. Otherwise, generate an output indication that no Photo Replacement forgery is suspected.

According to certain embodiments, the method of FIG. 2 includes any subset of or all of the following operations, suitably ordered e.g. as shown:

210. Collect typical DJPG values F for both single and doubly compressed documents, e.g. by providing two sets of images: set 1 (single compressed or "authentic") and set 2 (double compressed or "forged"). Optionally, member k of set 2 may be the double-compressed version of member k of set 1, but this need not be the case.

220. Compute DJPG feature values F for all the images in the single and double-compressed sets, thereby to yield two vectors of real feature values for the two sets respectively.

230. Find a threshold (aka Single-Double Compression Differentiation Threshold T (aka Resonance Threshold T) which optimally distinguishes between images in the single-compressed set on the one hand and images in the double-compressed set on the other hand.

It is appreciated that only in very specific situations e.g. images, e.g. of the same size, same JPEG quantization table, taken by the same camera, will the set1 values always all be smaller than the set2 values, enabling trivial selection of a perfectly functioning (0% detection error) threshold anywhere in the interval between the largest set1 value and the smallest set2 value. Typically, due to overlap between the distributions of the DJPG features values characterizing images in the 2 sets, any selected threshold T which renders docs that yield values F<T to be authentic, and all other documents forged, will generate some type 1 and type 2 detection errors e.g. False Alarms (FA) in which authentic docs trigger F>T or misdetections in which forged documents trigger F<T. Typically, a threshold value is selected such that the total percentage of FA, p(FA), does not exceed a reasonable use-case specific level, e.g. 2%. Any suitable operations may be employed to determine p(FA) e.g. providing a set of, say, hundreds of single compressed images, measuring the feature values F for all single compressed images in the set, and selecting a T value exceeded by only a small number (say: 10% or 5% or 2% or 1% or less) of F's.

Here and elsewhere, typically, images that are used are selected e.g. randomly from routine image traffic for a particular use-case. For example, when the use-case is examining images of ID documents presented by passengers at an airport, or by remote users of an Internet service, images may be a random sample of ID documents presented by passengers at the airport, or by remote users of the Internet service.

According to certain embodiments, the method of FIG. 3 includes any subset of or all of the following operations, suitably ordered e.g. as shown:

300: In a set-up process typically done once for all images rather than individually for each image, find value of threshold peak height V (a threshold that distinguishes real peaks from random noise peaks) e.g. using the set-up method of FIG. 4 below.

301. Convert the image sought to be tested for double JPEG compression (e.g. FaceCrop region), to a gray level image represented as an n×m matrix $M_1$.

302a. Generate a histogram of the DCT coefficients for $M_1$.

302b. Graph the magnitude of the Fourier transform of the DCT coefficient histogram generated in operation 302a.

302c. By visual inspection of the graph generated in operation 302b, or automatically, find all peaks higher than threshold value V predetermined in operation 300 above.

302d. Compute "before-disturb" DQ indicator f1 of the image by summing heights of all peaks found in operation 302c.

303. Disturb or excise or cut or remove a column or row (or more) of the matrix $M_1$ (e.g. the first column thereof) thereby to convert the n×m matrix $M_1$ into an n×(m−1) matrix $M_2$. Alternatively, a few rows or columns might be excised or removed, such as 2-7 rows or even more, as long as the number of removed rows or columns is not an integer multiple of the DCT block size (e.g. as long as the number of removed rows or columns is not 8, 16 etc. if the DCT blocks are 8×8 in size). However, typically, removing only one row or column, is both sufficient and yields better results.

304. Compute "after-disturb" DQ indicator f2 for matrix $M_2$ by repeating operations 302a-302d on matrix $M_2$ rather than on matrix $M_1$.

305. Compute Face-DJPG-indicator $F1=f_1/f_2$. It is appreciated that F is useful as a particularly convenient indicator of Double JPEG Compression, hence of forgeries.

306. To compute Non-face-DJPG-indicator F2, repeat operations 301-304—this time, using DocBody region (rather than FaceCrop region) as the image sought to be tested for double JPEG compression. Again compute the "before-disturb" DQ indicator f1/"after-disturb" DQ indicator f2 ratio and this time, define $f_1/f_2$ as Non-face-DJPG-indicator F2.

According to certain embodiments, the method of FIG. 4 includes any subset of or all of the following operations, suitably ordered e.g. as shown:

4A. Generate graphs (e.g. a set of, say, a few hundred graphs) of Fourier transforms of histograms of DCT coefficients for gray level image matrices where the raw images corresponding to the graphs are JPEG-compressed and are typically a subset e.g. random sample of routine image traffic characterizing the anticipated use-case.

4B. typically, measure heights of DCT coefficient histogram local maxima. Also, a noise level may be determined. For example, if the DCT coefficient histogram is flat (no local maxima), the noise level may be deemed zero.

4C. Derive threshold V to differentiate between peaks (aka "genuine" peaks) and noise where local maxima are deemed noise if their height falls below threshold height V over which a local maximum is considered a peak. For example peaks may be identified e.g. by hand/human visual inspection and a threshold V is then identified and recorded, which empirically leaves most or all identified peaks on one side, and most or all maxima not identified as peaks, on the other.

According to certain embodiments, the method of FIG. 5 includes any subset of or all of the following operations, suitably ordered e.g. as shown:

This method (or the method of FIG. 2) is typically done not off-line, but instead for each image in the incoming stream of images for which forgery detection is performed.

It is appreciated that a doubly compressed doc may have been modified by a graphical editor, e.g. some data may have been erased or added. It is appreciated that a doubly compressed document may be authentic and not a replacement forgery e.g. because people may use a graphical editor simply as an image viewer with no forgery intention, or may re-compress an image just to save memory space. These instances result in DC (double compressed) documents that, if deemed a forgery, constitute an undesirable false alarm. In contrast, a finding of a photo replacement is typically an extremely strong indication of forgery rather than a false alarm.

5a. Empirically determine values of threshold T(Q) that correspond to various JPEG compression quality levels Q (say Q=75, 80, 85, 90, 95, 100). For example, a sample of images, preferably typical of those expected in the anticipated use case, is assembled, e.g. a few hundred raw format (*.bmp) images. The sample is compressed at several different quality levels e.g. at compression quality Q=75, 80, 85, 90, 95, 100, yielding 6 JPEG image sets, each having its own Q. Then measure the feature F within each set and determine each set's threshold T (aka Single-Double Compression Differentiation Threshold T (aka Resonance Threshold T) as described above, typically complying with a predetermined constraint (for each of the sets) such as FA<2%

(less than 2% (or 1% or 5% or other) false alarms).

The Q value may be extracted from any JPEG file using suitable software tools. It is also known in the art to provide an image having a given JPEG compression quality using any suitable program tool such as but not limited to open sourced programs within the https://github.com community.

5b. T(Q) is monotonous as a function of Q, so interpolation between the T(Q) values or any other smoothing or curve-fitting technique may be used to yield a function which computes thresholds T(Q) for any quality level Q in segment [75, 100].

5c. Given any JPEG image, extract its quality level Q using any suitable programming tool and plug into the T function to obtain a resonance threshold T appropriate to this image.

It is appreciated that FIGS. 2, 5 are but two possible methods for determining the cut-off point or border or threshold T between presence and absence of resonance, where presence vs. absence of resonance in turn is used as a criterion for detecting local-replacement type forgeries as described in detail herein. One method happens to be based on a conventional logistic regression technique for selecting an optimal border between 2 classes e.g. resonance-present and resonance-absent, weighting false positives and false negatives similarly when evaluating optimality, and the other happens based on imposing an externally determined constraint restricting the probability of false alarms, e.g. to 2% if it is deemed acceptable, say, that two passports from 100 being screened for local-replacement type forgery in a particular use case, are wrongly declared as forgeries. Of course, other methods can be devised, depending on the use case. For example, in some use cases, it may be desired to impose an externally determined constraint restricting the probability of false negatives, rather than on false positives. Or, another technique rather than logistic regression technique may be employed to ensure optimality of the border (threshold) separating the 2 classes. Or, a criterion of bestness other than minimization of least squares of errors, may be employed.

It is appreciated that outputs generated by the systems and methods shown herein which may comprise outputs characterizing each image in a stream of incoming images as, say, authentic or forged or possibly forged, may be used to control any desired computerized process for example, the server may allow the end-user who presented an image deemed authentic to become an authorized end-user of an internet service and conversely may reject or disallow any end-user who presented an image deemed forged. And/or the outputs generated may determine at least in part which end-users are granted access to a physical or virtual area, access to which is restricted via a physical or virtual access control device which, say, selectively allows through end users if and only if the image they present is deemed authentic.

It is appreciated that implementation of embodiment herein as a cellular app and/or as a smartphone SDK and/or as a hardware component; and/or as an STK application, and/or as suitable combinations of any of the above, are all possible.

According to certain embodiments, resonance occurs when one compresses an image twice (or more) on the same JPEG grid, so that even after decompression the image carries the structure of resonance which may be measured e.g. by summing heights of peaks in Fourier magnitude graphs as described herein.

It is appreciated that the embodiments described herein are advantageous relative to certain prior art, in which the sum of heights feature as computed turns out to suffer from a lack of universality or invariance or to depend considerably on individual properties of image. This is a disadvantage e.g. because in certain prior art methods, it becomes hard to correctly choose a threshold to suitably separate single compression from double compression. For example, a method may JPEG-compress an image a, once, measure the feature f (sum of heights), and call that value fsingle. The method may then compress the same image twice and effect the same measurement, calling that value fdouble. A visible and considerable difference may be found e.g. fsingle=2, fdouble=4. Another image b is then taken up, and the procedure repeated. Now the resulting feature values fsingle, fdouble may be 4 and 7 respectively rather than 2 and 4 respectively. Since each image is only taken up once, there is difficulty in choosing a unique threshold that separates single from double compression. For example, assume the JPEG file of a third image c yields f=4. Absent the teachings herein, it is not easy to determine whether to classify the third image as single compressed or double compressed since f=4 has, for previous image a, been found when the image was single-compressed but for previous image b been found when the image was double-compressed.

This lack of invariance may result in high level of errors in single-double compression differentiation e.g. when very diverse, variable images occur in real life conditions.

A particular advantage of certain embodiments described herein is that on the one hand, the image is only slightly modified (e.g. only one row or column is deleted or otherwise modified), thereby to convert an original image, image', to a modified image, image''. Yet, this slight modification of the image radically changes the ratio between the almost identical images' respective DJPG features because the resonance structure present in image', is destroyed in image''. This yields an opportunity, absent in certain prior art solutions, to compare DJPG values. So for example, if an image a' yields fsingle=2, fdouble=4 when single and double compressed respectively, image a'' (a' with one row deleted, say) might yield fsingle=1.9, fdouble=1.9. Or, for example, if an image b' yields fsingle=4, fdouble=7 when single and double compressed respectively, image b'' (b' with one row deleted, say) might yield fsingle=4.1, fdouble=4.1. So the feature F (the ratio of the sum of peak heights before vs. after row deletion or other resonance disturbance) is more invariant hence more effective, for separating single from double compressions.

Advantages of certain embodiments may include:

The embodiments herein are universal and flexible particularly for treatment of large sets of highly variable images, since it is hardly affected by individual properties of individual images such as size, quality, mean intensity, compression level etc. and thereby is applicable for detection of photo-replacement forgeries in pictures arriving from varied sources e.g. id documents of different types (passports vs. driving licenses, say) arriving from different countries or photographs generated "in the wild' rather than having been generated using uniform equipment and procedures.

The embodiments herein typically do not require any machine learning tools to classify objects parametrized by a large number of features and thus it is simpler than state of the art Double Compression detection tools and other methods based on the double quantization concept.

It is appreciated that the applicability of the embodiments herein is not limited to distinctions made between single-compressed vs. double-compressed images. instead, the embodiments may be used, mutatis mutandis, to differentiate single-compressed images from n-times compressed images where n>=2, or to differentiate n-times-compressed images from (n+1)-times compressed images, or n-times-compressed images from (n+m)-times compressed images or more generally to differentiate m-compressed (m-times compressed) documents or other images from N-compressed documents or other images. Typically, for forgery detection, the most prevalent issue pertains to the special case of M=1 and N>=2 e.g. Double Compression Detection.

It is appreciated that terminology such as "mandatory", "required", "need" and "must" refer to implementation choices made within the context of a particular implementation or application described herewithin for clarity and are not intended to be limiting since in an alternative implementation, the same elements might be defined as not mandatory and not required, or might even be eliminated altogether.

Components described herein as software may, alternatively, be implemented wholly or partly in hardware and/or firmware, if desired, using conventional techniques, and vice-versa. Each module or component or processor may be centralized in a single physical location or physical device or distributed over several physical locations or physical devices.

Any "if-then" logic described herein is intended to include embodiments in which a processor is programmed to repeatedly determine whether condition x, which is sometimes true and sometimes false, is currently true or false and to perform y each time x is determined to be true, thereby to yield a processor which performs y at least once, typically on an "if and only if" basis e.g. triggered only by determinations that x is true and never by determinations that x is false.

Included in the scope of the present disclosure, inter alia, are electromagnetic signals in accordance with the description herein. These may carry computer-readable instructions for performing any or all of the operations of any of the methods shown and described herein, in any suitable order including simultaneous performance of suitable groups of operations as appropriate; machine-readable instructions for performing any or all of the operations of any of the methods shown and described herein, in any suitable order; program storage devices readable by machine, tangibly embodying a program of instructions executable by the machine to perform any or all of the operations of any of the methods shown and described herein, in any suitable order i.e. not necessarily as shown, including performing various operations in parallel or concurrently rather than sequentially as shown; a computer program product comprising a computer useable medium having computer readable program code, such as executable code, having embodied therein, and/or including computer readable program code for performing any or all of the operations of any of the methods shown and described herein, in any suitable order; any technical effects brought about by any or all of the operations of any of the methods shown and described herein, when performed in any suitable order; any suitable apparatus or device or combination of such, programmed to perform, alone or in combination, any or all of the operations of any of the methods shown and described herein, in any suitable order; electronic devices each including at least one processor and/or cooperating input device and/or output device and operative to perform e.g. in software any operations shown and described herein; information storage devices or physical records, such as disks or hard drives, causing at least one computer or other device to be configured so as to carry out any or all of the operations of any of the methods shown and described herein, in any suitable order; at least one program pre-stored e.g. in memory or on an information network such as the Internet, before or after being downloaded, which embodies any or all of the operations of any of the methods shown and described herein, in any suitable order, and the method of uploading or downloading such, and a system including server/s and/or client/s for using such; at least one processor configured to perform any combination of the described operations or to execute any combination of the described modules; and hardware which performs any or all of the operations of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any operation or functionality described herein may be wholly or partially computer-implemented e.g. by one or more processors. The invention shown and described herein may include (a) using a computerized method to identify a solution to any of the problems or for any of the objectives described herein, the solution optionally includes at least one of a decision, an action, a product, a service or any other information described herein that impacts, in a positive manner, a problem or objectives described herein; and (b) outputting the solution.

The system may, if desired, be implemented as a web-based system employing software, computers, routers and telecommunications equipment as appropriate.

Any suitable deployment may be employed to provide functionalities e.g. software functionalities shown and described herein. For example, a server may store certain applications, for download to clients, which are executed at the client side, the server side serving only as a storehouse. Some or all functionalities e.g. software functionalities shown and described herein may be deployed in a cloud environment. Clients e.g. mobile communication devices, such as smartphones, may be operatively associated with, but external to, the cloud.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Features of the present invention, including operations, which are described in the context of separate embodiments may also be provided in combination in a single embodiment. For example, a system embodiment is intended to include a corresponding process embodiment and vice versa. Also, each system embodiment is intended to include a server-centered "view" or client centered "view", or "view" from any other node of the system, of the entire functionality of the system, computer-readable medium, apparatus, including only those functionalities performed at that server or client or node. Features may also be combined with features known in the art and particularly although not limited to those described in the Background section or in publications mentioned therein.

Conversely, features of the invention, including operations, which are described for brevity in the context of a single embodiment or in a certain order may be provided separately or in any suitable subcombination, including with features known in the art (particularly although not limited to those described in the Background section or in publications mentioned therein) or in a different order. "e.g." is used herein in the sense of a specific example which is not intended to be limiting. Each method may comprise some or all of the operations illustrated or described, suitably ordered e.g. as illustrated or described herein.

Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, Smart Phone (e.g. iPhone), Tablet, Laptop, PDA, Blackberry GPRS, Satellite including GPS, or other mobile delivery. It is appreciated that in the description and drawings shown and described herein, functionalities described or illustrated as systems and sub-units thereof can also be provided as methods and operations therewithin, and functionalities described or illustrated as methods and operations therewithin can also be provided as systems and sub-units thereof. The scale used to illustrate various elements in the drawings is merely exemplary and/or appropriate for clarity of presentation and is not intended to be limiting.

The invention claimed is:

1. A forensic method for identifying at least some forged documents, the method comprising, for each stream of incoming JPEG images:

using a processor configured to determine whether at least one individual JPEG image in the stream is a forgery including:
> computing a first compression indicator for a first portion of the individual JPEG image at a known location;
> computing a second compression indicator for a second portion of the individual JPEG image that resides at a comparison location within the individual JPEG image; and
> determining whether the computed first compression indicator and the computed second compression indicator fulfill at least one predetermined logical criterion, and deciding whether the individual JPEG image is a forgery.

2. The method according to claim 1, wherein the first portion includes a date field.

3. The method according to claim 2, wherein the location of the first portion or the second portion is known from a data repository that stores knowledge regarding locations of specific image portions, in images with pre-known recognizable formats.

4. The method according to claim 3, wherein the pre-known recognizable formats include a country-specific or version specific identification document.

5. The method according to claim 3, wherein the pre-known recognizable formats includes a financial institution-specific cheque format.

6. The method according to claim 2, wherein the locations of the first portion and the second portion are determined by finding one or more locations within the individual JPEG image possessing known characteristics of the first portion and the second portion.

7. The method according to claim 6, wherein:
> the known characteristic of at least one of the first portion and the second portion is that the portion includes an image of a human face; and
> the finding of the one or more locations includes performing automatic human face detection at a plurality of locations in the individual JPEG image.

8. The method according to claim 6, wherein:
> the known characteristic of at least one of the first portion and the second portion is that the portion includes a bar-code; and
> the finding of the one or more locations includes performing automatic bar-code detection.

9. The method according to claim 1, wherein the computing of at least one compression indicator includes, for at least one of the first portion or the second portion of the individual JPEG image:
> a. computing a quantization indicator in the at least one portion to yield an f1 value, which is a "before-disturb" indicator; and
> b. disturbing a resonance of the at least one portion to generate a resonance-disturbed image, and re-computing the quantization indicator including computing the quantization indicator of the resonance-disturbed image to yield an f2 value, which is an "after-disturb" indicator.

10. The method according to claim 9, wherein the disturbing of the resonance includes changing a number of instances of at least one row/column in the at least one portion.

11. The method according to claim 10, wherein the disturbing of the resonance includes changing the number of instances of exactly one row/column from the at least one portion.

12. The method according to claim 10, wherein the changing of the number of instances includes removing at least one row to reduce the number of instances of at least one row from 1 to 0.

13. The method according to claim 10, wherein the changing of the number of instances includes adding at least one row.

14. The method according to claim 13, wherein the adding of at least one row includes duplicating at least one row to increase the number of instances of at least one row from one to at least two.

15. The method according to claim 9, wherein the quantization indicator includes a sum of peak heights computed over all peaks exceeding a predetermined threshold V, in a graph of a Fourier transform of a DCT coefficient histogram of a matrix representing a gray level image generated from an image or image portion to be tested for JPEG compression.

16. The method according to claim 9, further comprising:
> c. combining the "before-disturb" indicator f1 and the "after-disturb" indicator f2 values to yield the quantization indicator.

17. The method according to claim 16, wherein the combining includes computing a ratio of the "before-disturb" indicator f1 and the "after-disturb" indicator f2 values.

18. The method according to claim 1, wherein:
> the at least one logical criterion includes:
>> whether the computed first compression indicator and the computed second compression indicator are on opposite sides of a predetermined resonance threshold T.

19. A forensic system for identifying at least some forged documents, the system comprising:
> a processor configured to determine whether at least one individual JPEG image in a stream of incoming JPEG images is a forgery including:
>> computing a first compression indicator for a first portion at a known location;
>> computing a second compression indicator for a second portion of the individual JPEG image that is located at a comparison location within the individual JPEG image; and
>> determining whether the first compression indicator and the second compression indicator fulfill at least one predetermined logical criterion, and deciding whether the individual JPEG image is a replacement forgery.

20. The system according to claim 19, wherein the computing of at least one compression indicator includes, for at least one of the first portion or the second portion of the individual JPEG image, computing a quantization indicator in the at least one portion to yield an f1 value, which is a "before-disturb" indicator.

21. The system according to claim 19, wherein:
> the at least one logical criterion includes:
>> whether the computed first compression indicator and the computed second compression indicator are on opposite sides of a predetermined resonance threshold T, and
>> whether the computed first compression indicator and the computed second compression indicator differ to a predetermined extent delta.

22. The system according to claim 21, wherein the deciding includes deciding that the individual JPEG image is a forgery when the computed first compression indicator and the computed second compression indicator are on opposite sides of resonance threshold T and the computed first compression indicator and the computed second compression indicator differ to the predetermined extent delta.

23. A non-transitory tangible computer readable medium having computer readable program code stored therein, the computer readable program code being configured to be executed to implement a forensic method for identifying at least some forged documents, the method comprising, for each of a stream of incoming JPEG images:

using a processor configured for determining whether at least one individual JPEG image in the stream is a forgery including:
computing a first compression indicator for a first portion at a known location;
computing a second compression indicator for a second portion of the individual JPEG image that resides at a comparison location within the individual JPEG image; and
determining whether the first compression indicator and the second compression indicator fulfill at least one predetermined logical criterion, and deciding whether the individual JPEG image is a forgery.

* * * * *